US011105384B2

(12) United States Patent
Romer et al.

(10) Patent No.: US 11,105,384 B2
(45) Date of Patent: Aug. 31, 2021

(54) MAGNETORHEOLOGICAL BRAKING FOR WELL TUBULARS

(71) Applicant: ExxonMobil Upstream Research Company, Spring, TX (US)

(72) Inventors: Michael C. Romer, The Woodlands, TX (US); Jeff H. Moss, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/895,134

(22) Filed: Jun. 8, 2020

(65) Prior Publication Data
US 2021/0010348 A1 Jan. 14, 2021

Related U.S. Application Data

(60) Provisional application No. 62/873,058, filed on Jul. 11, 2019.

(51) Int. Cl.
| | | |
|---|---|---|
| *F16D 57/00* | (2006.01) |
| *E21B 17/20* | (2006.01) |
| *F16D 63/00* | (2006.01) |
| *E21B 19/08* | (2006.01) |
| *F16L 55/46* | (2006.01) |
| *E21B 40/00* | (2006.01) |
| *F16L 101/70* | (2006.01) |

(52) U.S. Cl.
CPC ............ *F16D 57/002* (2013.01); *E21B 17/20* (2013.01); *F16D 63/008* (2013.01); *F16L 55/46* (2013.01); *E21B 19/08* (2013.01); *E21B 40/00* (2013.01); *F16L 2101/70* (2013.01)

(58) Field of Classification Search
CPC ........ E21B 17/20; E21B 19/22; F16D 63/008; F16D 57/002
See application file for complete search history.

(56) References Cited

U.S. PATENT DOCUMENTS

| | | | | |
|---|---|---|---|---|
| 3,758,078 A * | 9/1973 | Grenn | ...................... | F04B 47/06 254/279 |
| 2005/0133228 A1* | 6/2005 | Shampine | ............... | E21B 19/22 166/382 |
| 2005/0253350 A1* | 11/2005 | Suchta | ................. | B60G 21/106 280/124.106 |
| 2009/0250205 A1* | 10/2009 | Koopmans | .............. | E21B 19/22 166/66.4 |
| 2012/0205122 A1* | 8/2012 | Peter | ...................... | E21B 34/085 166/373 |
| 2013/0046417 A1* | 2/2013 | Schroter | ............... | E21B 47/024 700/302 |
| 2017/0254150 A1* | 9/2017 | Stockey | .................. | E21B 7/064 |
| 2019/0089273 A1* | 3/2019 | Kirby | .................... | F16D 63/008 |
| 2019/0242208 A1* | 8/2019 | Estrada-Giraldo | ... | E21B 21/003 |
| 2020/0155091 A1* | 5/2020 | Dirisio | .................. | F16D 65/186 |
| 2021/0102597 A1* | 4/2021 | Romer | .................... | E21B 47/10 |

* cited by examiner

*Primary Examiner* — Shane Bomar
(74) *Attorney, Agent, or Firm* — ExxonMobil Upstream Research Company—Law Department (57) ABSTRACT

Systems and a method for braking an object are provided. An example method, includes determining the expected speed of the object, monitoring the expected speed of the object, and determining if the actual speed of the object is within a preset tolerance of the expected speed. If the speed is not within the preset tolerance of the expected speed, a magnetorheological brake is activated to slow the object.

24 Claims, 8 Drawing Sheets

MAGNETORHEOLOGICAL BRAKING FOR WELL TUBULARS

CROSS-REFERENCE TO RELATED APPLICATION

This application claims the benefit of U.S. Provisional Application 62/873,058 filed Jul. 11, 2019 entitled MAGNETORHEOLOGICAL BRAKING FOR WELL TUBULARS, the entirety of which is incorporated by reference herein.

FIELD

The techniques described herein provide a method for protecting a well from inadvertent motion of a tubular. Specifically, techniques are described for magnetorheological braking of a well tubular.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

Blowout Preventers (BOPs) are commonly used as a means of well control in drilling, completion, and workover operations. BOPs consist of hydraulically-actuated rams with varied profiles/orientations and an annular or "bag" section. A typical BOP ram stack from bottom to top contains slip, pipe, shear, and blind rams. In this configuration the pipe rams are sized such that their profile matches the outer diameter of the pipe being tripped through the BOPs for better gripping when they close. The slip rams mechanically "bite" into the pipe to keep it from moving up out of the well or from falling down into the well. Shear rams cut through the pipe, and blind rams seal across the top of cut pipe. Many other ram models and configurations are available. The annular BOP can be described as a hydraulically-actuated donut that can close and seal on the pipe OD or other shape with varying gripping pressure. Pipe can be dynamically tripped through the annular BOP in certain situations.

BOPs are typically controlled remotely with a manual command from an operator. They are actuated at the beginning of usage and at regular intervals to verify operation and sealing effectiveness. BOPs have been successfully used in the industry for many years.

One incident that BOPs have been unable to prevent is pipe ejections. When pipe is run into a well, its cross sectional-area is acted upon by the active pressure in the well. If this force is less than that created by the pipe's buoyant weight, the string is considered "pipe heavy". If the pressure-generated force is greater than the pipe's weight, the string is "pipe light". The possibility of pipe ejection exists when the string is in a pipe-light condition. Efforts are made to kill the well with fluids that match the reservoir pressure gradient to reduce the pressure acting on the pipe when there's a potential for a pipe-light condition. Well killing activities can be reduced or stopped once enough pipe has been run into a well to make the string pipe heavy.

In some cases where well killing could be detrimental to the producing formation, a process called snubbing may be used. Snubbing is where pipe is dynamically "forced" into a well against the active pressure, and is generally considered a risky operation to be avoided if possible.

In almost all cases, well killing and snubbing are effective and well work can be performed without loss of containment events. Many potential well control issues can be identified far enough in advance that well killing operations can commence and/or BOPs can be actuated to prevent an issue.

However, unforeseen pipe breaks and consequent ejections can be an exception. A string that transitions from a pipe-heavy condition to a pipe-light condition due to a mechanical issue, such as a part, hole, or coupling failure, among others, may be ejected from a well at a high velocity, making it difficult for the operators to react in time to actuate the BOP stack to stop the ejection. Further, the hydraulic rams in a BOP take some time to fully close. Even if the BOP stack and rams were actuated immediately, the BOP stack would have to absorb the momentum of the pipe being ejected from the well, which may be several thousand pounds. Further, absorbing the momentum of the moving pipe may impair the BOP stack, for example, damaging the shears, or misaligning the pipe in the shears, preventing it from controlling hydrocarbon release from the well.

SUMMARY

An exemplary embodiment provides a method for braking an object. The method includes determining an expected speed of the object, monitoring an actual speed of the object, determining if the actual speed of the object is within a preset tolerance of the expected speed. A magnetorheological brake is activated to slow the object if the speed is not within the preset tolerance of the expected speed.

The object may be a coiled tubing. Determining the expected speed of the object may include obtaining a set point from a control system for a speed of a coiled tubing. Determining the expected speed of the object may include obtaining a set point from a control system for a speed of a pipe joint lowered into a well. Determining the actual speed of the object may include measuring the actual speed of a pig in a pipeline upstream of the pig catcher. Monitoring the actual speed of the object may include measuring a rotational speed of an instrumented wheel in contact with the object. Monitoring the actual speed of the object may include measuring changes in a magnetic field as the object passes through the magnetic field.

Determining if the actual speed is within a preset tolerance of the expected speed may include determining if the object has reversed direction. Determining if the actual speed is within a preset tolerance of the expected speed may include determining if a pipe has entered a pipe-like condition. Determining if the actual speed is within a preset tolerance of the expected speed may include determining if a pipe has entered a pipe-heavy condition.

Activating the magnetorheological brake may include energizing electromagnets proximate to a reservoir of a magnetorheological fluid. Activating the magnetorheological brake may include ramping the energization of electromagnets proximate to a reservoir of a magnetorheological fluid.

Another exemplary embodiment provides a blowout preventer stack that includes a magnetorheological brake. The magnetorheological brake may be disposed at the top of the blowout preventer stack. The magnetorheological brake may be disposed at the bottom of the blowout preventer stack.

The magnetorheological brake may include a velocity detector configured to monitor a pipe speed, a controller coupled to the velocity detector, a reservoir of magnetorheological fluid (MRF) surrounding a pipe, and a seal configured to hold the MRF in the reservoir as the pipe is moved through the reservoir. An electromagnet is disposed proximate to the reservoir, wherein the electromagnet is configured to be energized by the controller. The magnetorheological brake may include a top seal and a bottom seal. The magnetorheological brake may include a sealing fabric disposed between the MRF and the pipe.

Another exemplary embodiment provides a controller for a magnetorheological brake. The controller includes a processor and a magnet controller communicatively coupled to the processor, wherein the magnet controller is configured to energize electromagnets in a magnetorheological braking system. A sensor input/output system is communicatively coupled to the processor, wherein the sensor input/output system is configured to interface to a motion sensor. A data store is communicatively coupled to the processor. The data store comprises instructions that, when executed by the processor, direct the processor to: read the motion sensor to determine a speed of an object, compare the speed of the object to a set point, and energize the electromagnets to slow the motion of the object.

The controller may include a power supply coupled to a power line from a power source and a battery coupled to the power supply, wherein the power supply is configured to charge the battery. The battery is configured to power the controller and energize the electromagnets of connection to the power source is lost. The controller includes a communications interface communicatively coupled to a power line communications device communicatively coupled to the power line from the power source.

The sensor input/output system of the controller may include a serial bus coupled to the motion sensors. The sensor input/output system may include an analog-to-digital converter coupled to magnetic coils in the motion sensor, wherein the magnetic coils are configured to detect movement of the object. The motion sensor may be a high frequency magnetic field sensor.

Another exemplary embodiment provides a magnetorheological braking system. The magnetorheological braking system includes a velocity sensor configured to detect a velocity of an object and a magnetorheological brake including a magnetorheological fluid (MRF) reservoir and electromagnets disposed proximate to the MRF reservoir. The magnetorheological brake is configured to slow or stop the object when the electromagnets are energized. The magnetorheological braking system includes a controller that includes a processor configured to implement instructions from a data store, and the data store. The data store includes instructions to direct the processor to read the velocity for the object from the velocity sensor, compare the velocity to preset limits for the velocity, and energize the electromagnets if the velocity is outside of the preset limits. The velocity sensor may include a coil configured to detect changes in a magnetic field.

The magnetorheological braking system may be disposed as a top unit in a blowout preventer stack. The magnetorheological braking system may be disposed as a bottom unit in a blowout preventer stack.

The object may include a pipe joint passing through the MRF reservoir, wherein seals in contact with the object at each end of the MRF reservoir are configured to retain the MRF. The magnetorheological braking system may be disposed in a pig catcher.

DESCRIPTION OF THE DRAWINGS

The advantages of the present techniques are better understood by referring to the following detailed description and the attached drawings.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As used herein, "tubular" refers to any type of pipe, unless specifically stated otherwise. The terms may be used in combination with "joint" to mean a single unitary length, or a "string" meaning two or more interconnected joints.

As used herein, "coiled tubing" refers to any continuous or endless pipe string that may be wound on a spool or otherwise deployed rapidly including continuous metal tubulars such as low-alloy carbon-steel tubulars, composite coiled tubulars, capillary tubulars and the like.

As used herein, a "well cleanout" is a well intervention operation that is often performed using a coiled tubing to remove debris, such as sand, rock fragments, dirt, or other materials, from a wellbore.

As used herein, a "pig" generally refers to a device inserted into a flowline pipeline for cleaning purposes. In some cases, the pressure of the flow behind the pig may push the pig along the pipeline to clean out various deposits, such as corrosion products, scale, wax, and other types of debris. As used herein, the term pigging generally refers to the act of moving a pig through a pipeline, typically for the purposes of cleaning or inspecting the line.

As used herein, a "pig catcher" generally refers to a device used to slow and intercept a pig at the end of a pipeline.

As used herein, "pipe-light" refers to a condition in which a tubular, such as a coiled tubing line, has a positive buoyancy relative to the downhole environment. As a result, the tubular may be ejected from the well.

As used herein, "pipe-heavy" refers to a condition in which a tubular, such as a coiled tubing line, has a negative buoyancy relative to the downhole environment. Although this may be the normal condition, in a pipe-heavy condition the weight of the tubular may exceed the systems used to suspend the tubular in a well, or may have broken off below the systems used to suspend the tubular in the well, causing the tubular to drop into the well.

As used herein, a "seal" is a device or substance used in a joint between two apparatuses where the device or substance makes the joint substantially impervious to or otherwise substantially inhibits, over a selected time period, the passage through the joint of a target material, e.g., a solid, liquid and/or gas. As used herein, a seal may reduce the loss of a magnetorheological fluid from a magnetorheological braking system.

Techniques described herein may be used to slow or stop tubulars in wellbores using a magnetorheological fluid (MRF). The motion of the tubular may be detected with a sensor, such as a magnetic or optical sensor. If an unexpected motion of the tubular is detected, electromagnets disposed proximate to the MRF may be energized. The MRF is a liquid suspension of particles that can be transitioned from a liquid to a viscoelastic solid with the application of a magnetic field. The system may be activated with sufficient speed to prevent ejection of a tubular from a well, such as during a pipe-light situation, or the dropping of a tubular into a well, such as if the tubular fails in the well.

Velocity sensors exist that use high frequency magnetic field sensors, or wave-based technologies, among others, to determine the velocity of objects in a well, such as a plunger lift sensor. The MRF could be used in a special ram or annular type of BOP section to apply a varying gripping pressure to tubulars moving into or out of a well based on the measurement from the velocity sensor. For example the velocity sensor would determine whether the movement of the tubular exceeded a predefined critical velocity, either out of or into the well.

A controller would use the measurements from the velocity sensor to energize the electromagnets around the MRF, for example, quickly enough to brake the tubular over a relatively short period of time. The sensing system may also be used to identify pipe OD changes in advance to manage collar or other upsets. Some amount of the tubular would move through the BOP, while the MRF BOP unit dissipated the string's momentum. Once the velocity of the tubular was reduced to a manageable value, the standard hydraulic BOPs could be triggered to arrest the event and establish well control. Accordingly, the combination of the hydraulic BOP stack with the electronic MRF system would enhance the operation of the BOP stack to improve the control of the well under conditions in which the tubular is moving outside of expected limits.

Although the examples described herein are directed to a coiled tubing operation, it can be understood that the techniques used will apply to any type of tubular. This includes, for example, drill string, production tubing, and other tubulars used to drill or complete a well. Further, the techniques may be used in other applications, such as decelerating a pig in a pig catcher.

Figure 1:
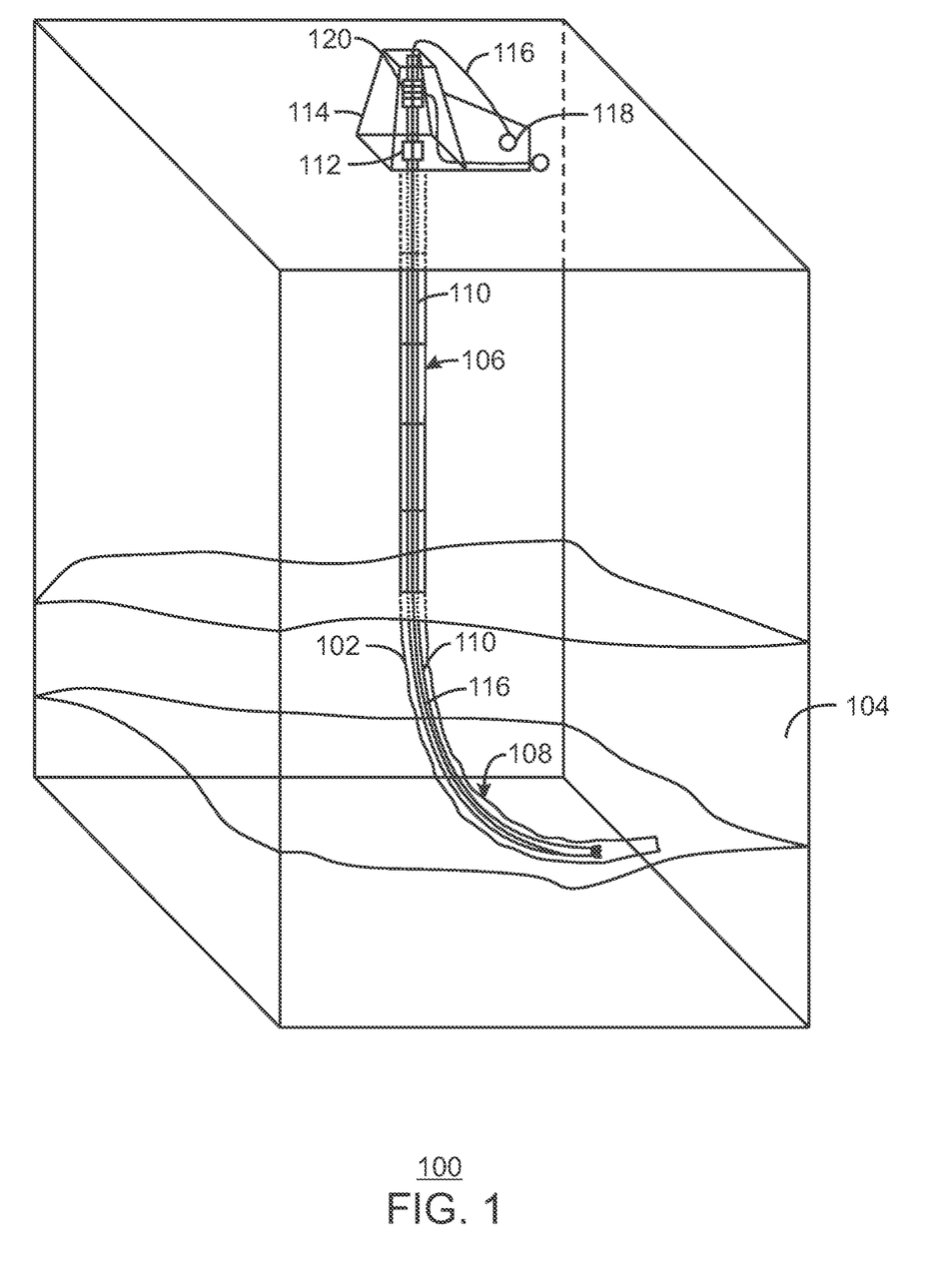
FIG. 1 is a schematic drawing of a cleanout operation for a well, in accordance with examples.

FIG. 1 is a schematic drawing 100 of a cleanout operation for a well 102, in accordance with examples. The well is drilled to a reservoir 104, and includes cased section 106 and an un-cased section 108. Production tubing 110 fluidically couples a wellhead 112 to the reservoir 104. Over time, solids can build up in the production tubing 110, or the well 102, slowing, or even stopping, the flow of hydrocarbons from the reservoir 104.

Accordingly, a cleanout operation may be performed to remove the solids from the well 102. During the cleanout operation, a frame 114 may be placed over the wellhead 112 to guide and insert coiled tubing 116 into the well 102 from a spool 118. Additionally, a blower preventer (BOP) 120 may be attached to the wellhead 112 to prevent situations in which hydrocarbon fluids are forcefully ejected from the well 102. For example, this may occur during a pipe-light condition of the coiled tubing, a failure of the coiled tubing, a snubbing operation, among others. However, as described herein, a BOP 120 may not be able to adequately seal a well if the coiled tubing 116 is moving through the BOP 120.

Accordingly, in examples described herein, the BOP 120 may include, or be attached to, a magnetorheological braking system. The magnetorheological braking system may detect the movement of pipe outside of preset limits, such as upwards during periods when controls are set to insert pipe downwards into the well, or about a tolerance range for a set speed, such as about 5% higher than the set speed, about 10% higher than the set speed, about 20% higher than the set speed, or higher.

Upon detecting that the pipe is moving outside of preset limits, the magnetorheological braking system may be activated to slow or stop the movement the pipe. In some examples, the BOP 120 is activated to seal the well 102, for example, shearing the pipe.

Figure 2:
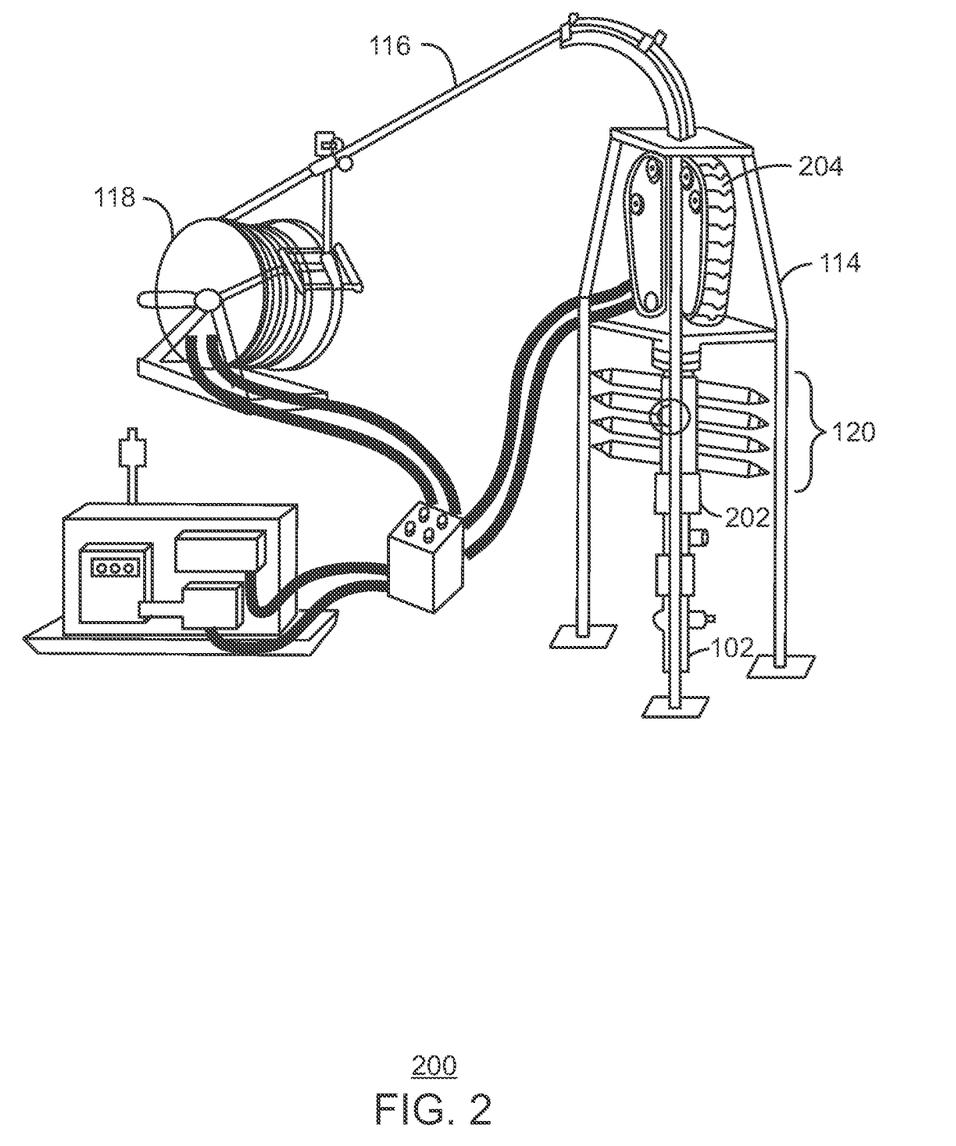
FIG. 2 is a drawing of a coiled tubing system that is used to feed coiled tubing into a well through a BOP and a magnetorheological braking system, in accordance with examples.

FIG. 2 is a drawing of a coiled tubing system 200 that is used to feed coiled tubing 116 into a well 102 through a BOP 120 and a magnetorheological braking system 202, in accordance with examples. Like numbered items are as described with respect to FIG. 1. In this example, a tractor system 204 is used to force the coiled tubing 116 into the well 102. In other examples, the frame 114 may hold a roller to direct the coiled tubing 116 into the well 102, for example, using a motor on the spool 118, or the weight of the coiled tubing 116 itself, to provide the force.

The use of the magnetorheological braking system 202 is not limited to coiled tubing applications, but may be used in any type of applications in which a tubular is moved into or out of a well. For example, the magnetorheological braking system 202 may be used while production tubing is inserted into the well, drill pipe is inserted in the well, or any number of other tubulars are used. Further, as described herein, the magnetorheological braking system 202 may be used in other applications, for example, to catch pigs, such as cleanout or instrumented pigs in a pig catcher at the end of a pipe run, among other applications. A magnetorheological braking system 202 is described further with respect to FIG. 3.

Figure 3:
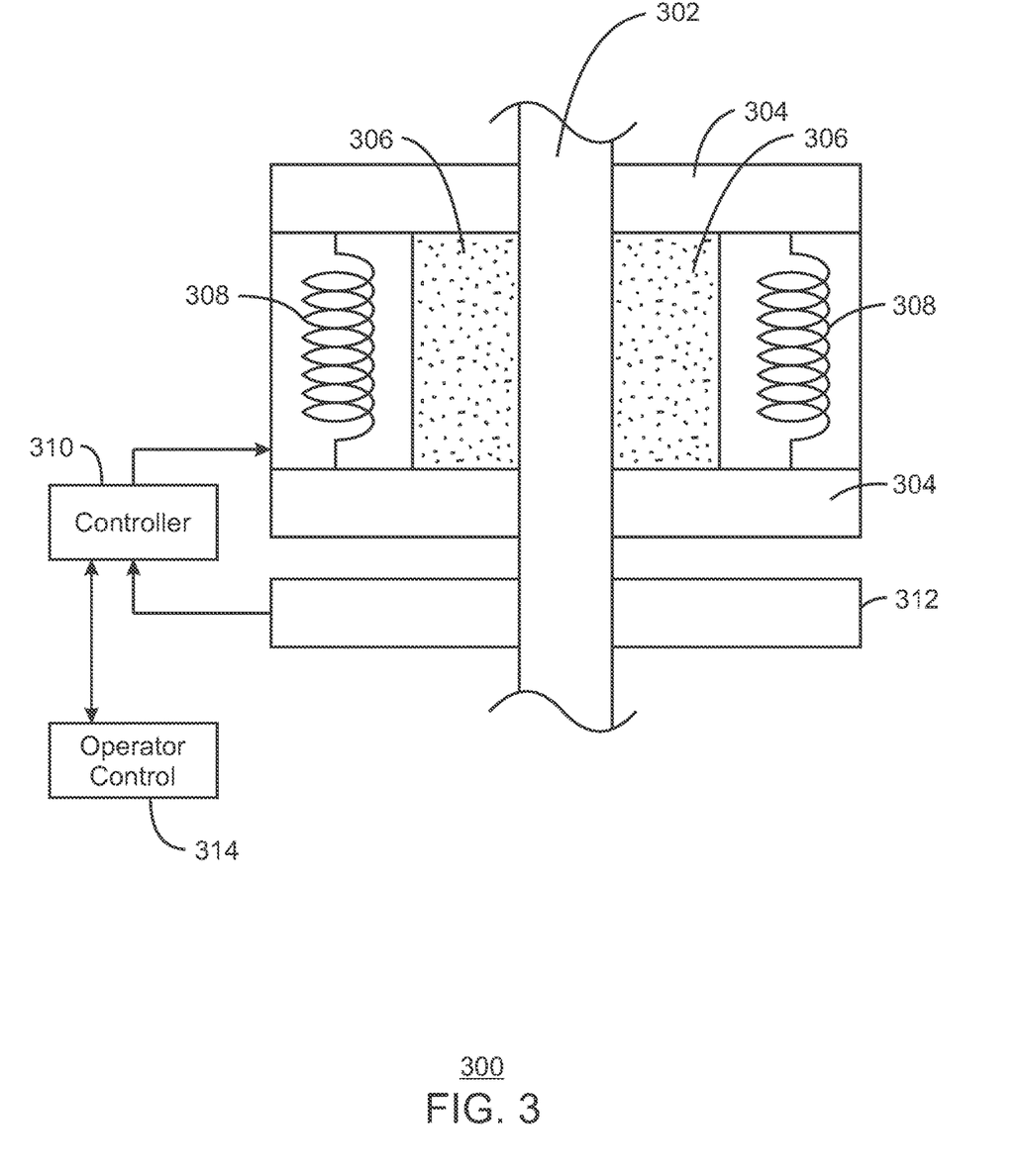
FIG. 3 is a drawing of a magnetorheological braking system, in accordance with examples.

FIG. 3 is a drawing of a magnetorheological braking system 300, in accordance with examples. In this example, a tubular 302 passes through the magnetorheological braking system 300. Seals 304 are used to retain a magnetorheological fluid (MRF) in an MRF reservoir 306 that is in contact with the tubular 302, while the tubular 302 moves through the MRF reservoir 306. Other configurations may be used, such as a low friction piston surface in contact with the tubular 302, in which friction is increased by activation of the magnetorheological braking system 300. In other examples, the seals 304 may include a sealing fabric in contact with the pipe and the MRF, which holds the MRF in the MRF reservoir 306.

The MRF is a suspension that can transition from a liquid to a viscoelastic solid, and into regions there between, with the application of a magnetic field. In various examples, the MRF is a suspension of about 20% to about 40%, by weight, of magnetic particles in a liquid. In one example, the MRF is a suspension of iron particles in mineral oil, water, glycol, or other solvents.

Electromagnets 308 are positioned proximate to the MRF reservoir 306. The electromagnets 308 may include a number of individual coils, e.g., three, four, five, or six, or more, placed in enclosures around the MRF reservoir 306, or maybe two or three large coils that are placed around the top, sides, and bottom of the MRF reservoir 306. Multiple coils may provide resistance to failure of individual coils, or energizing systems. When the electromagnets 308 are energized, the magnetic particles in the MRF in the MRF reservoir 306 align, for example, forming chains that connect to the sides of the MRF reservoir 306 and the tubular 302. This transitions the MRF from a liquid to a viscoelastic solid. The transition increases the friction on the tubular 302, allowing the tubular 302 to be braked, slowing the tubular 302 as it passes through the MRF reservoir 306. The amount of the energization of the electromagnets 308 may be used to control the amount of braking force, for example, full energization may provide very high resistance to motion of the tubular 302, while a partial energization may be used to slow the tubular 302. Accordingly, the magnetorheological braking system 300 may be used in normal operations to control a rate of speed of the tubular 302, or to hold the tubular 302 in place during other operations.

The electromagnets 308 are energized by a controller 310, which is coupled to a speed sensor 312. The controller 310 is described further with respect to FIG. 4. In addition to energizing the magnets, for example, when detecting a speed outside of a tolerance range of a set point, the controller 310 may also link to operator control systems 314, for example, control systems for a coiled tubing cleanout, control systems on a drilling rig, or a local control system, such as an emergency stop button.

The speed sensor 312 may be a magnetic field sensor that can detect the speed of the tubular 302 as it passes through the speed sensor 312. In some embodiments, the speed sensor 312 may be an adapted plunger lift sensor, such as the Sasquatch™ sensor available from Extreme Telematics Corporation. Other types of sensors may be used, such as optical sensors, instrumented rollers, and the like.

Figure 4:
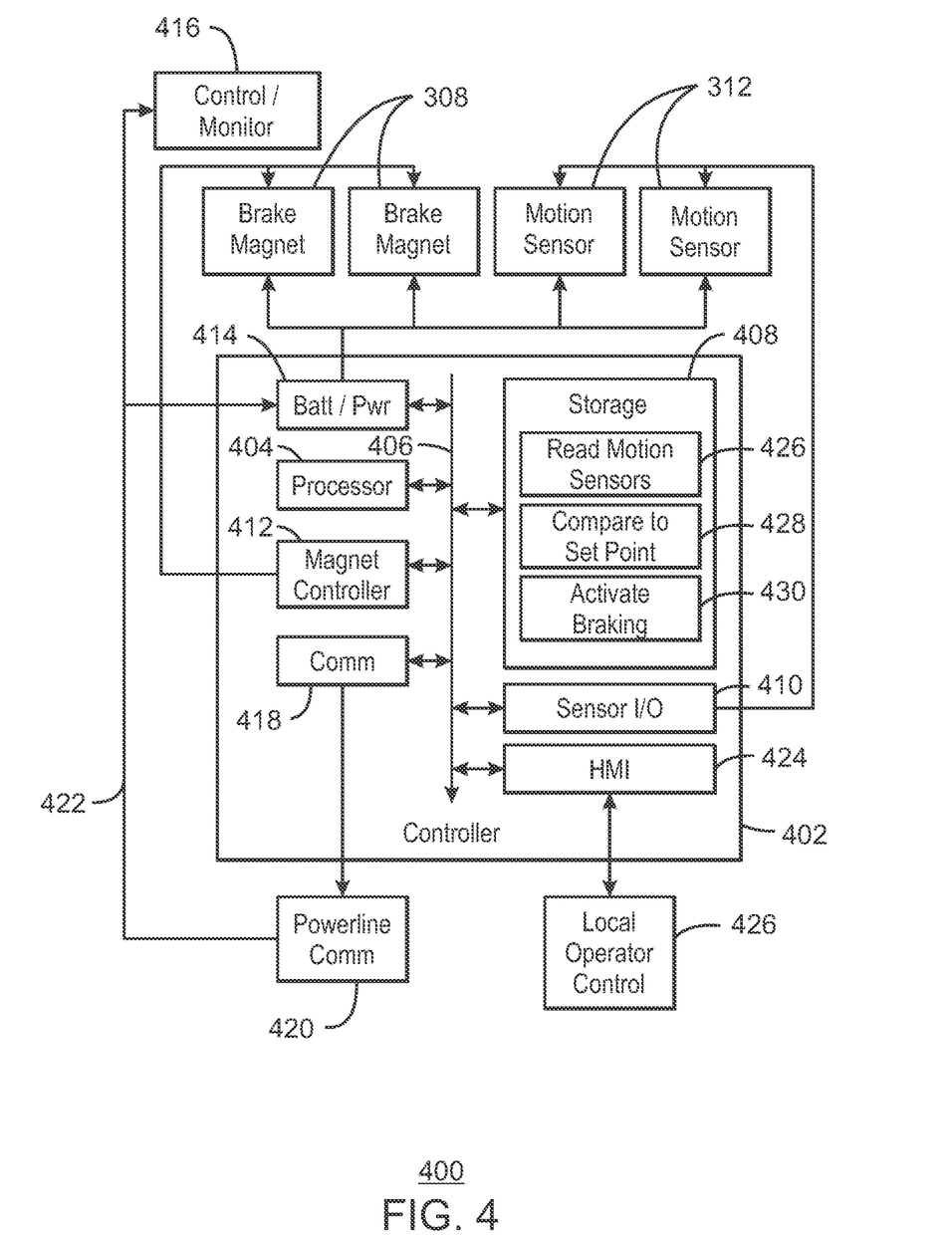
FIG. 4 is a block diagram of a magnetorheological braking system that includes a controller, in accordance with an example.

FIG. 4 is a block diagram of a magnetorheological braking system 400 that includes a controller 402, in accordance with an example. Like numbered items are as described with respect to FIG. 3. The controller 402 may be an individual controller dedicated to the magnetorheological braking system 400, or the controller 402 may be a virtual system that is part of a larger system, such as a control system for a coiled tubing cleanout system, a drilling rig, or a BOP control system, including, for example, a distributed control system (DCS), a portable control system, a personal computer, a laptop computer, or a mobile device, among others.

The controller 402 has a processor 404 coupled to other functional units through a bus 406. The processor 404 may include any number of processing systems. In an example, the processor 404 is a microprocessor used for a control system. In other examples, the processor 404 is a system-on-a-chip, a multithreaded processor, a virtual processor, a multicore processor, or any number of other processing devices, or any combinations thereof.

The processor 404 is communicatively coupled to the bus 406. In one example, the bus 406 is a proprietary bus used in a system-on-a-chip. In various examples, the bus 406 is a dedicated high-speed serial bus, such as PCIe, or a parallel bus, such as ISA or EISA, among others. The bus 406 may include a backplane interconnect in a DCS. The bus 406 may also include lines for power and power control, among others.

The bus 406 couples the processor 404 to a data store 408. In some examples, the data store 408 includes a nonvolatile storage system for data and programs, such as a hard drive, an optical drive, a solid-state drive, a thumb drive, a nonvolatile memory, and the like. The data store 408 may also include functional memory for the operation of programs and storage of data, such as random access memory, and the like. The functional memory may be nonvolatile, allowing the controller 402 to resume operations at a particular state after a power failure.

The bus 406 couples the processor 404 to a sensor input/output (I/O) interface 410. The sensor I/O interface 410 couples the controller 402 to motion sensors 312, for example, for the determination of the motion of a tubular, as described with respect to FIG. 3. In one example, the sensor I/O interface 410 is a digital interface, such as a serial bus, for communicating with the motion sensors 312. In other examples, the sensor I/O interface 410 is an analog-to-digital converter (ADC) for converting an analog signal, such as a 4 to 20 mA current loop, from the motion sensors to a digital signal for the processor 404. If a 4 to 20 mA current loop is used, a precision resistor may be used to convert the current to a voltage for the ADC. The motion sensors 312 may include coils to detect changes in magnetic fields around a tubular, for example, as an object passes through the tubular. The changes may be correlated to the speed of the object in the tubular.

The bus 406 couples the processor to a magnet controller 412. The magnet controller 412 allows the controller 402 to energize the electromagnets 308. In one example, the magnet controller 412 includes MOSFETs, or other circuitry, to allow incremental energization of the electromagnets 308, allowing for control of the braking force. In another example, the magnet controller 412 are relays that, when energized, complete a power loop that includes one or more of the electromagnets 308. In this example, multiple electromagnets 308 may be energized separately to obtain different braking forces, for example, if four electromagnets 308 are used, a separate relay may be used to energize each of the four electromagnets 308 to allow different levels of braking force to be applied.

A battery/power supply 414 may be included in the controller 402 to provide power to the controller 402, the electromagnets 308, and the motion sensors 312. In this example, a power line from a power source, such as a controlling and monitoring system 416, may be used to provide power to the battery/power supply 414, to power devices and to charge a battery. The controlling and monitoring system 416 may be a control system, for example, located at a top side drilling rig in a subsea operation in which the magnetorheological braking system 400 is located at a BOP at a wellhead on the seafloor. In some examples, the controlling and monitoring system 416 may be a well cleanout controller associated with a coiled tubing system. If present, the battery is used to power the magnetorheological braking system 400 during periods in which power from the controlling and monitoring system 416 is lost. As described herein, the controlling and monitoring system 416 may be used to control the magnetorheological braking system 400. However, the controller 402 may automatically activate the magnetorheological braking system 400, for example, in the event of a motion of a tubular that is outside of a tolerance range around a motion set point. This may also occur if the controller 402 loses contact with the controlling and monitoring system 416.

In addition to providing power, the battery/power supply 414 may be communicatively coupled to the bus 406 to allow the processor 404 to monitor the status of the battery/power supply 414. For example, for monitoring the charge on the battery, the current flow, and the like. This may be used to provide alarms to the control and monitoring system 416 in case a battery is going bad.

Other units may be included in the controller 402 to facilitate operations and control. For example, the controller 402 may include a communications interface 418, such as a network interface controller, to provide communications with the control and monitoring system 416. The communications interface 418 may interface with a power line communications device 420, which may provide communications with the control and monitoring system 416 over the power line 422. This may be performed, for example, by imposing a high-frequency signal on the power line 422, or reading a high-frequency signal from the power line 422, for digital communications between the control and monitoring system 416 and the controller 402.

The controller 402 may also include a human machine interface 424 that is used to interface to a local operator control 426. The local operator control 426 may be an activation button used to stop operations at a well cleanout site, for example, by powering down all equipment used to move the tubular and activating the magnetorheological braking system 400.

The data store 408 stores instructions that when executed by the processor 404 direct the processor to perform the control functions for the magnetorheological braking system 400. These instructions include, for example, a code module 426 that directs the processor to read the motion sensors 312. This may be performed on a loop that reads the motion sensors 312 on an interval of about 500 milliseconds (ms), about 1 second, about 5 seconds, or about 10 seconds, depending on an expected time constant for a change in a motion of the tubular. During some operations, such as snubbing, in which a coiled tubing line is forced into a well under pressure, a shorter interval may be used. In other operations, such as the placement of a production tubular during a well completion operation, a longer time constant may be used.

Another code module 428 that may be included in the data store 408 compares the value read from the motion sensors 312 to an expected value or set point. The comparison may include calculating a tolerance limit around the set point outside of which braking is activated. In some conditions, the motion is assumed to be outside of a tolerance limit, even if slow. For example, if the set point is at 0 m/s and the tubular begins to move in either direction, the code module 428 may be configured to indicate that the motion is outside of tolerance limits. Further, if the set point, or expected motion, is into the wellbore, and the tubular shows any motion out of the wellbore, the code module 428 may be configured to indicate that the motion is outside of tolerance limits.

If the motion is determined to be outside of tolerance limits, a code module 430 may be configured to activate the electromagnets 308 of the magnetorheological braking system 400 to slow or stop the motion of the tubular. The activation of the electromagnets 308 may be configured to be incremental depending on the motion detected. For example, if the tubular fails leading to a high speed motion, the electromagnets 308 may be incrementally activated to slow the tubular before bringing it to a stop. This may help to prevent further failures due to stresses caused by sudden decelerations.

Figure 5:
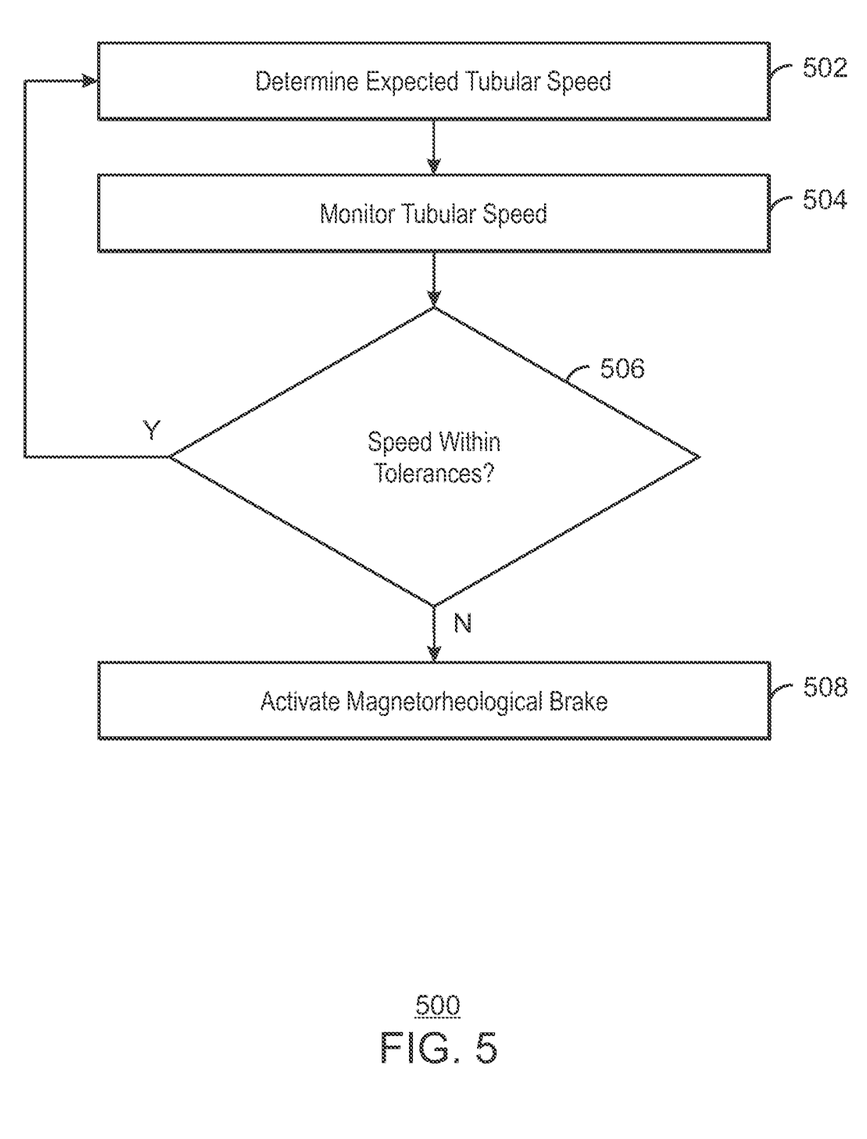
FIG. 5 is a process flow diagram of a method for using a magnetorheological brake to slow a tubular, in accordance with an example.

FIG. 5 is a process flow diagram of a method 500 for using a magnetorheological brake to slow a tubular, in accordance with an example. The method 500 begins at block 502, with a determination of the expected speed of the tubular. This may be directly determined from the set point or from a combination of a set point and the well conditions, for example, immediately after a motion set point is entered, the expected speed of the tubular may be slower than the set point as it accelerates. Further, tolerances for the set point may be determined at block 502 to indicate when a motion is outside of the expected range, for example, about 5% above the set point, about 10% above the set point, or about 15% above the set point, among others.

At block 504, the actual speed of the tubular is monitored. This may be performed using a motion sensor as described with respect to FIG. 4. In some examples, the actual speed of the tubular is monitored using other devices in addition to, or instead of, motion sensors. These other devices may include, for example, a wheel engaged with a coiled tubing at the top of a frame over a blowout preventer, among others.

At block 506, a determination is made as to whether the actual speed is within the tolerances of the expected speed. If so, process flow returns to block 502 to repeat the process. If the actual speed is not within tolerances at block 506, at block 508, the magnetorheological braking system is activated, slowing or stopping the motion of the tubular. In some examples, if a determination is made that the motion of the tubular has reversed direction, such as moving out of a well when a set point is for moving into the well, the magnetorheological braking system is activated. Once the magnetorheological braking system is activated, a manual intervention may be needed to return the system to the initial state at block 502.

Figure 6:
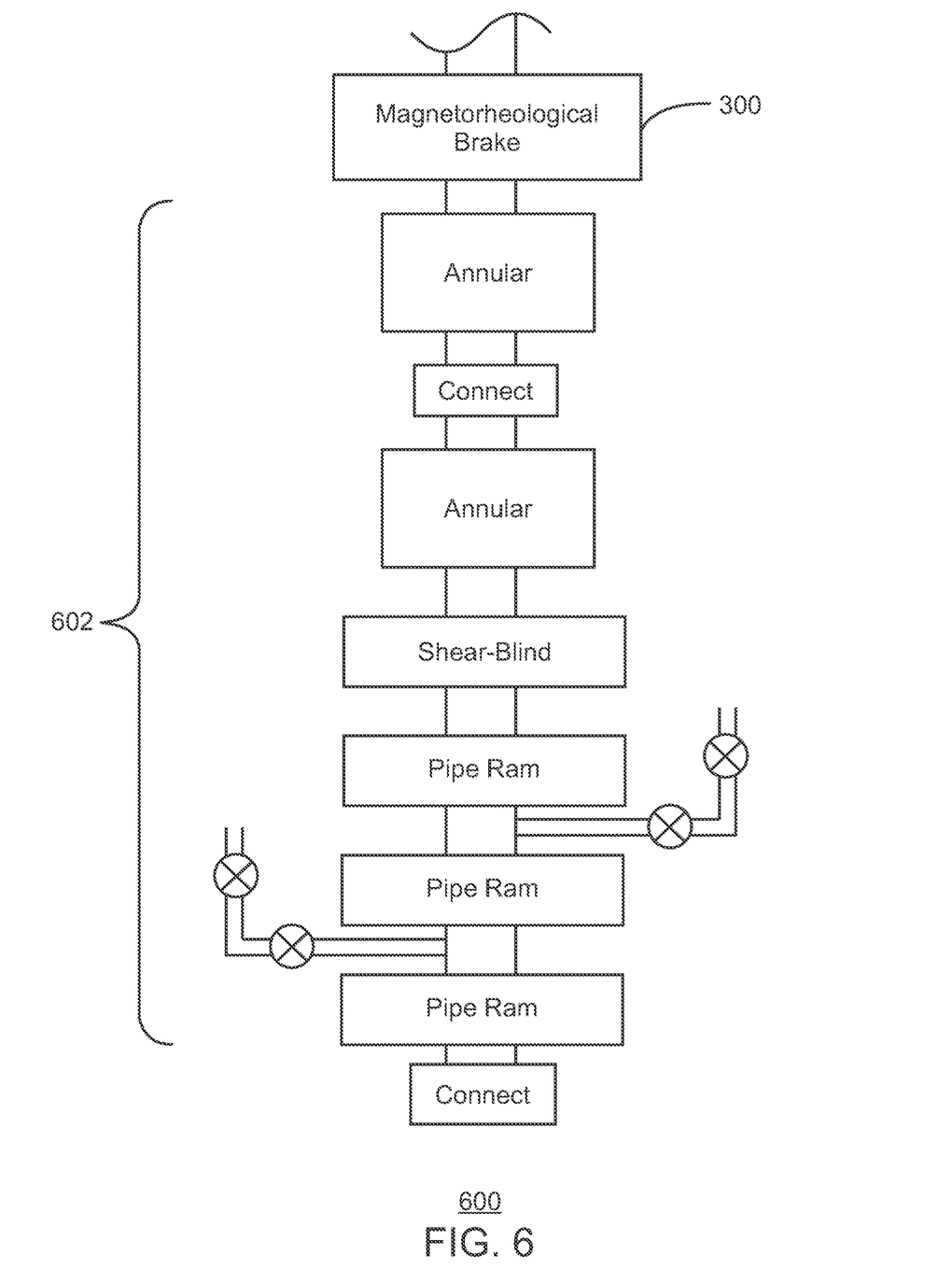
FIG. 6 is a drawing of a blowout preventer that includes a magnetorheological braking system at the top of the stack, in accordance with an example.

FIG. 6 is a drawing of a blowout preventer 600 that includes a magnetorheological braking system 300 at the top of the blowout preventer stack 602, in accordance with an example. Like numbered items are as described with respect to FIG. 3. A magnetorheological brake may be located in any number of locations in a well. In the example shown in FIG. 6, a magnetorheological braking system 300 is placed at the top of the blowout preventer stack 602, which includes the different valves and devices making up the blowout preventer 600. It may be noted that this is merely an example of the blowout preventer 600, as blowout preventer 600 used for different applications may have different combinations of valves. In this example, the combination of devices in the blowout preventer stack 602 may be typical of devices in a blowout preventer 600 used for subsea applications. In other examples, such as a blowout preventer 600 used for a coiled tubing cleanout.

Figure 7:
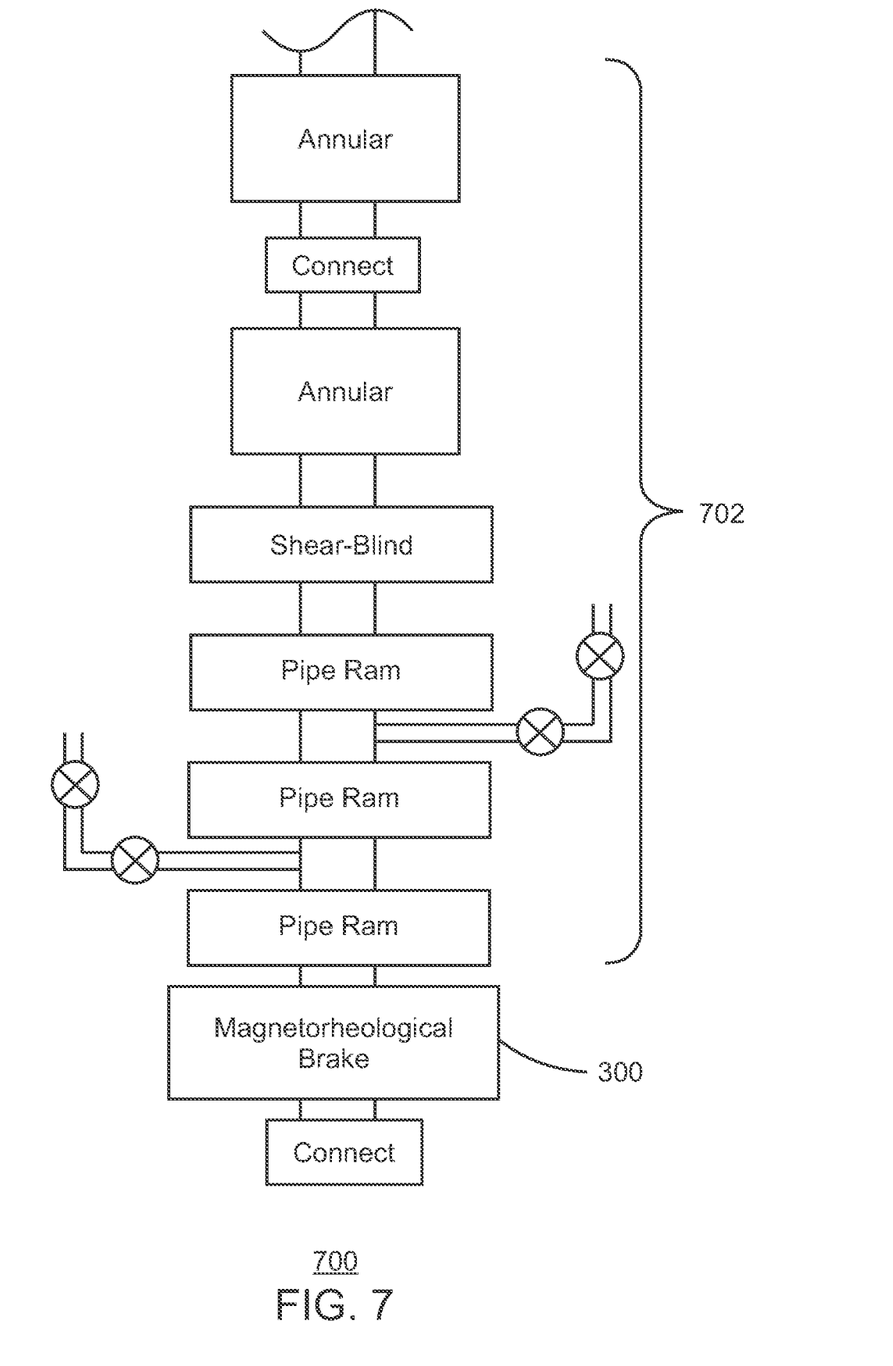
FIG. 7 is a drawing of a blowout preventer that includes a magnetorheological braking system at the bottom of the stack, in accordance with an example.

FIG. 7 is a drawing of a blowout preventer 700 that includes a magnetorheological braking system 300 at the bottom of the blowout preventer stack 702, in accordance with an example. Like numbered items are as described with respect to FIG. 3. In this example, the weight of the blowout preventer stack 702 may provide force against the magnetorheological brake 300. As for the blowout preventer 600, described with respect to FIG. 6, any number of different devices may be included in the blowout preventer stack 702, depending on the application environment for the blowout preventer 702.

The use of the magnetorheological braking system 300 in combination with the blowout preventer 600 provides advantages over each system by itself. If the tubular crosses a predefined critical velocity in the upwards or the downward direction, the controller may activate the magnetorheological braking system 300 to slow or stop the tubular. Once the momentum of the tubular was dissipated, the blowout preventer 600 could be activated to close the well and establish well control. This would increase the reliability of the blowout preventer 600 by dissipating the momentum prior to contact with the valves and shears of the blowout preventer.

Figure 8:
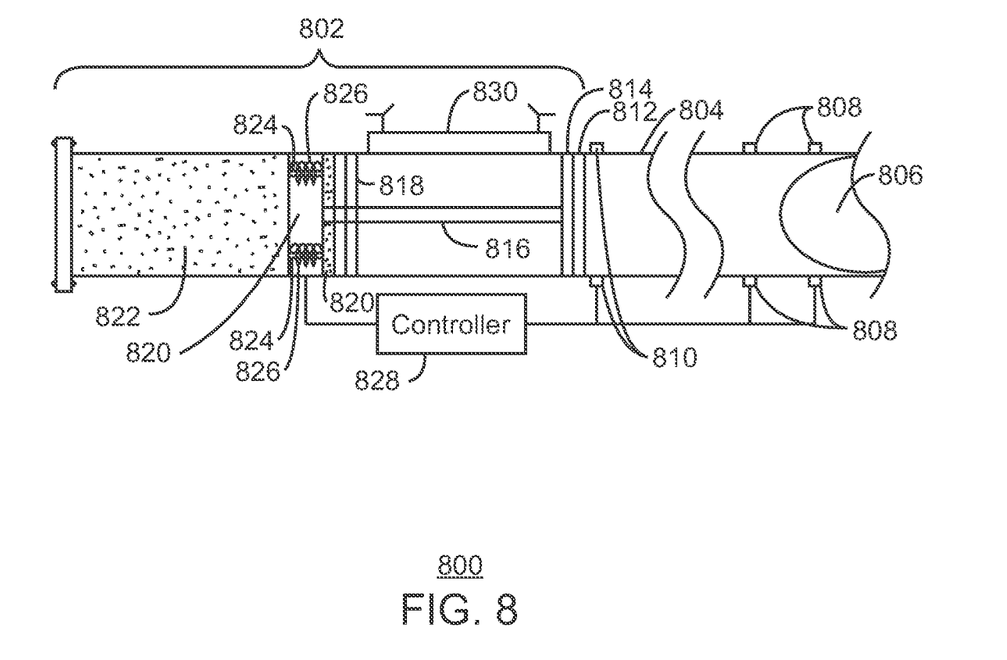
FIG. 8 is a drawing of a pig catcher that includes a magnetorheological braking system, in accordance with an example.

FIG. 8 is a drawing 800 of a pig catcher 802 that includes a magnetorheological braking system, in accordance with an example. The pig catcher 802 may be placed at a dead segment of a pipeline 804, for example, after a fluid conduction path has branched off. A pig 806, such as a cleanout pig or an instrumented pig, is sent down the pipeline 804. Motion sensors 808 placed along the pipeline 804 may detect the approach of the pig 806, and determine the velocity of the pig 806. A final set of motion sensors 810, for example, placed immediately before the pig catcher may determine the velocity of the pig 806 just as it enters the pig catcher. The motion sensors 808 and 810 may be as described with respect to the motion sensors 312 of FIGS. 3 and 4.

114 The pig catcher may include an impact pad 812, such as an elastomeric or fibrous material, to lower the impact of the pig 806 against a piston head 814. The piston head 814 may couple to a piston rod 816 which passes through a bulkhead 818 to a braking piston 820. The braking piston 820 is located in a reservoir 822 that holds a magnetorheological braking fluid. The magnetorheological braking fluid may be as described with respect to FIG. 3. Channels 824 in the braking piston 820 allow the magnetorheological braking fluid to flow between the sides of the braking piston 820 as it is moved through the reservoir 822. Magnetic coils 826 are disposed proximate to the channels 824. When energized, the magnetic coils 826 change the viscoelastic properties of the magnetorheological braking fluid in the channels 824, for example, increasing the resistance to flow of the magnetorheological braking fluid through the channels 824.

In this example, a controller 828 detects the velocity of the pig 806 using the motion sensors 808 and 810, and proportionally energizes the magnetic coils 826 to slow the pig 806 to a stop. The controller 828 may be as described with respect to the controllers 310 and 402 of FIGS. 3 and 4. The energy applied to the magnetic coils 826 may be about 0% of full energization when the pig 806 first comes in contact with the impact pad 812 and may then be linearly or exponentially increased to full power by the controller 828 as the braking piston 820 is pushed back in the reservoir 822. Once the pig 806 is brought to a full halt, the pig catcher may be isolated from the pipeline 804, and a hatch 830 in the pipeline 804 may be opened to remove the pig 806 and move the piston head 814 back to the initial position.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method for braking an object, comprising:
   determining an expected speed of the object;
   monitoring an actual speed of the object;
   determining if the actual speed of the object is within a preset tolerance of the expected speed; and
   activating a magnetorheological brake to slow the object if the speed is not within the preset tolerance of the expected speed.

2. The method of claim 1, wherein the object is a coiled tubing.

3. The method of claim 1, wherein determining the expected speed of the object comprises obtaining a set point from a control system for a speed of a coiled tubing.

4. The method of claim 1, wherein determining the expected speed of the object comprises obtaining a set point from a control system for a speed of a pipe joint lowered into a well.

5. The method of claim 1, wherein determining the actual speed of the object comprises measuring the actual speed of a pig in a pipeline upstream of a pig catcher.

6. The method of claim 1, wherein monitoring the actual speed of the object comprises measuring a rotational speed of an instrumented wheel in contact with the object.

7. The method of claim 1, wherein monitoring the actual speed of the object comprises measuring changes in a magnetic field as the object passes through the magnetic field.

8. The method of claim 1, wherein determining if the actual speed is within a preset tolerance of the expected speed, comprises determining if the object has reversed direction.

9. The method of claim 1, wherein determining if the actual speed is within a preset tolerance of the expected speed comprises determining if a pipe has entered a pipe-light condition.

10. The method of claim 1, wherein determining if the actual speed is within a preset tolerance of the expected speed comprises determining if a pipe has entered a pipe-heavy condition.

11. The method of claim 1, wherein activating the magnetorheological brake comprises energizing electromagnets proximate to a reservoir of a magnetorheological fluid.

12. The method of claim 1, wherein activating the magnetorheological brake comprises ramping the energization of electromagnets proximate to a reservoir of a magnetorheological fluid.

13. A controller for a magnetorheological brake, comprising:
- a processor;
- a magnet controller communicatively coupled to the processor, wherein the magnet controller is configured to energize electromagnets in a magnetorheological braking system;
- a sensor input/output system communicatively coupled to the processor, wherein the sensor input/output system is configured to interface to a motion sensor; and
- a data store communicatively coupled to the processor, wherein the data store comprises instructions that, when executed by the processor, direct the processor to:
  - read the motion sensor to determine a speed of an object;
  - compare the speed of the object to a set point; and
  - energize the electromagnets to slow the motion of the object.

14. The controller of claim 13, comprising:
- a power supply coupled to a power line from a power source; and
- a battery coupled to the power supply, wherein the power supply is configured to charge the battery, and wherein the battery is configured to power the controller and energize the magnets if a connection to the power source is lost.

15. The controller of claim 13, comprising a communications interface communicatively coupled to a power line communications device communicatively coupled to the power line from the power source.

16. The controller of claim 13, wherein the sensor input/output system comprises a serial bus coupled to the motion sensors.

17. The controller of claim 13, wherein the sensor input/output system comprises an analog-to-digital converter coupled to magnetic coils in the motion sensor, wherein the magnetic coils are configured to detect movement of the object.

18. The controller of claim 13, wherein the motion sensor is a high frequency magnetic field sensor.

19. A magnetorheological braking system, comprising:
- a velocity sensor configured to detect a velocity of an object;
- a magnetorheological brake comprising a magnetorheological fluid (MRF) reservoir and electromagnets disposed proximate to the MRF reservoir, wherein the magnetorheological brake is configured to slow or stop the object when the electromagnets are energized; and
- a controller, comprising:
  - a processor configured to implement instructions from a data store; and
  - the data store, comprising instructions to direct the processor to:
    - read the velocity for the object from the velocity sensor;
    - compare the velocity to preset limits for the velocity; and
    - energize the electromagnets if the velocity is outside of the preset limits.

20. The magnetorheological braking system of claim 19, wherein the velocity sensor comprises a coil configured to detect changes in a magnetic field.

21. The magnetorheological braking system of claim 19, wherein the magnetorheological braking system is disposed as a top unit in a blowout preventer stack.

22. The magnetorheological braking system of claim 19, wherein the magnetorheological braking system is disposed as a bottom unit in a blowout preventer stack.

23. The magnetorheological braking system of claim 19, wherein the object comprises a pipe joint passing through the MRF reservoir, and wherein seals in contact with the object at each end of the MRF reservoir are configured to retain the MRF.

24. The magnetorheological braking system of claim 19, wherein the magnetorheological braking system is disposed in a pig catcher.

* * * * *